US010552688B2

(12) United States Patent
Faber et al.

(10) Patent No.: US 10,552,688 B2
(45) Date of Patent: Feb. 4, 2020

(54) METHOD AND DEVICE FOR DETECTING OBJECTS IN THE SURROUNDINGS OF A VEHICLE

(75) Inventors: Petko Faber, Renningen (DE); Gregor Schwarzenberg, Calw (DE)

(73) Assignee: Robert Bosch GmbH, Stuttgart (DE)

(*) Notice: Subject to any disclaimer, the term of this patent is extended or adjusted under 35 U.S.C. 154(b) by 1163 days.

(21) Appl. No.: 14/124,971

(22) PCT Filed: May 21, 2012

(86) PCT No.: PCT/EP2012/059348
§ 371 (c)(1),
(2), (4) Date: Apr. 17, 2014

(87) PCT Pub. No.: WO2012/168055
PCT Pub. Date: Dec. 13, 2012

(65) Prior Publication Data
US 2014/0098997 A1 Apr. 10, 2014

(30) Foreign Application Priority Data
Jun. 7, 2011 (DE) .......................... 10 2011 077 038

(51) Int. Cl.
*B60Q 1/14* (2006.01)
*G06K 9/00* (2006.01)
(Continued)

(52) U.S. Cl.
CPC ....... *G06K 9/00791* (2013.01); *B60Q 1/1423* (2013.01); *B60R 1/00* (2013.01);
(Continued)

(58) Field of Classification Search
CPC .............. B60Q 2300/42; B60Q 1/1423; B60Q 2300/41; B60Q 1/143; B60Q 2300/3321;
(Continued)

(56) References Cited

U.S. PATENT DOCUMENTS 7,023,454 B1 * 4/2006 Knight .................. H04N 7/148
345/473
7,038,577 B2 * 5/2006 Pawlicki ............... B60W 30/18
340/435
(Continued)

FOREIGN PATENT DOCUMENTS

CN 1413861 A 4/2003
DE 10 2005 033 863 1/2007
(Continued)

OTHER PUBLICATIONS

Machine translation of EP 2 165 882 A1, retrieved Jul. 25, 2019, 30 pages total. Retrieved: https://patentscope.wipo.int/search/en/detail.jsf?docId=EP11122201&_cid=P10-JYHH46-44267-1 (Year: 2019).*
(Continued)

*Primary Examiner* — Andrew M Moyer
*Assistant Examiner* — Dennis Rosario
(74) *Attorney, Agent, or Firm* — Norton Rose Fulbright US LLP; Gerard Messina

(57) ABSTRACT

A method for detecting objects in the surroundings of a vehicle. The method includes reading in a first image, of a vehicle camera, which represents the surroundings taken using a first exposure time and reading in a second image of the vehicle camera, which was taken after the first image and using a second exposure time, the second exposure time differing from the first exposure time, and extracting an image detail from the second image, the image detail representing a smaller area of the surroundings than the first image. During the extracting, a position of the image detail in the second image is determined based on at least one parameter which represents information on travel of the vehicle and/or a position of an infrastructure measure in front of the vehicle and/or which is independent of a moving (Continued)

object that was detected in a preceding step in the image detail.

19 Claims, 3 Drawing Sheets

(51) Int. Cl.
*H04N 5/235* (2006.01)
*B60R 1/00* (2006.01)
*G06K 9/60* (2006.01)

(52) U.S. Cl.
CPC ............. *G06K 9/60* (2013.01); *H04N 5/2356* (2013.01); *H04N 5/2357* (2013.01); *B60Q 2300/112* (2013.01); *B60Q 2300/3321* (2013.01)

(58) Field of Classification Search
CPC ........ B60Q 2300/314; B60Q 2300/112; G06K 9/00825; G06K 7/10732; G06K 9/00791; G06K 9/00818; G06K 9/00798; G06K 9/2018; G06K 9/2027; G06K 9/00805; H04N 5/2353; H04N 5/2355; H04N 5/243; H04N 5/2357; H04N 5/2351; H04N 5/2356; G06T 2207/10144; G06T 2207/30252; G06T 7/73; H04L 67/12; G05D 1/0088; G05D 1/0278; G05D 2201/0213; G05D 1/0246; G05D 1/0287; H04W 4/80; H04W 4/50; H04W 4/027; G08G 1/0112; G08G 1/167; G08G 1/09623; B60R 1/00; B60R 2001/1253; H04B 10/116

See application file for complete search history.

(56) References Cited

U.S. PATENT DOCUMENTS

| | | | |
|---|---|---|---|
| 7,167,796 B2* | 1/2007 | Taylor | B60C 23/0408 701/431 |
| 7,565,006 B2* | 7/2009 | Stam | B60Q 1/085 315/82 |
| 7,571,053 B2* | 8/2009 | Ishikura | B60T 8/17551 340/438 |
| 7,623,680 B2* | 11/2009 | Takahama | B60R 1/00 382/104 |
| 7,720,580 B2* | 5/2010 | Higgins-Luthman | B60R 1/00 701/28 |
| 7,899,213 B2* | 3/2011 | Otsuka | B60Q 1/1423 348/113 |
| 8,017,898 B2* | 9/2011 | Lu | B60Q 1/1423 250/208.1 |
| 8,108,097 B2* | 1/2012 | Mattes | B60T 8/172 340/435 |
| 8,115,830 B2* | 2/2012 | Kato | H04N 5/23222 348/234 |
| 8,223,038 B2 | 7/2012 | Bauer et al. | |
| 8,254,635 B2* | 8/2012 | Stein | G06K 9/00798 382/103 |
| 8,421,880 B2* | 4/2013 | Sekiguchi | H04N 5/2357 348/228.1 |
| 8,456,327 B2* | 6/2013 | Bechtel | B60R 1/04 340/435 |
| 9,725,039 B2* | 8/2017 | Matsukawa | H04N 7/183 |
| 2004/0143380 A1 | 7/2004 | Stam et al. | |
| 2009/0147116 A1 | 6/2009 | Koyama et al. | |
| 2010/0013928 A1 | 1/2010 | Haug | |
| 2015/0219809 A1* | 8/2015 | Ruhnau | H04N 5/35563 348/360 |

FOREIGN PATENT DOCUMENTS

| | | | |
|---|---|---|---|
| DE | 10 2007 001 099 | 7/2008 | |
| EP | 1 513 103 | 3/2005 | |
| EP | 2165882 A1 * | 3/2010 | ............ B60Q 1/143 |
| JP | 6-274626 | 9/1994 | |
| JP | 2005-92857 | 4/2005 | |
| JP | 2010-272067 | 12/2010 | |
| WO | WO 97/35743 | 10/1997 | |
| WO | WO 98/43850 | 10/1998 | |
| WO | WO 03/093857 | 11/2003 | |

OTHER PUBLICATIONS

Takahashi et al., Introduction of HONDA ASV-2(Advanced safety Vehicle-Phase 2), Oct. 5, 2000 [retrieved Sep. 13, 2019], Proceedings of the IEEE Intelligent Vehicle Symposium 2000, pp. 694-701. Retrieved : https://ieeexplore.ieee.org/abstract/document/898430 (Year: 2000).*

International Search Report and Written Opinion, International Application No. PCT/EP2012/059348, dated Dec. 18, 2012.

* cited by examiner

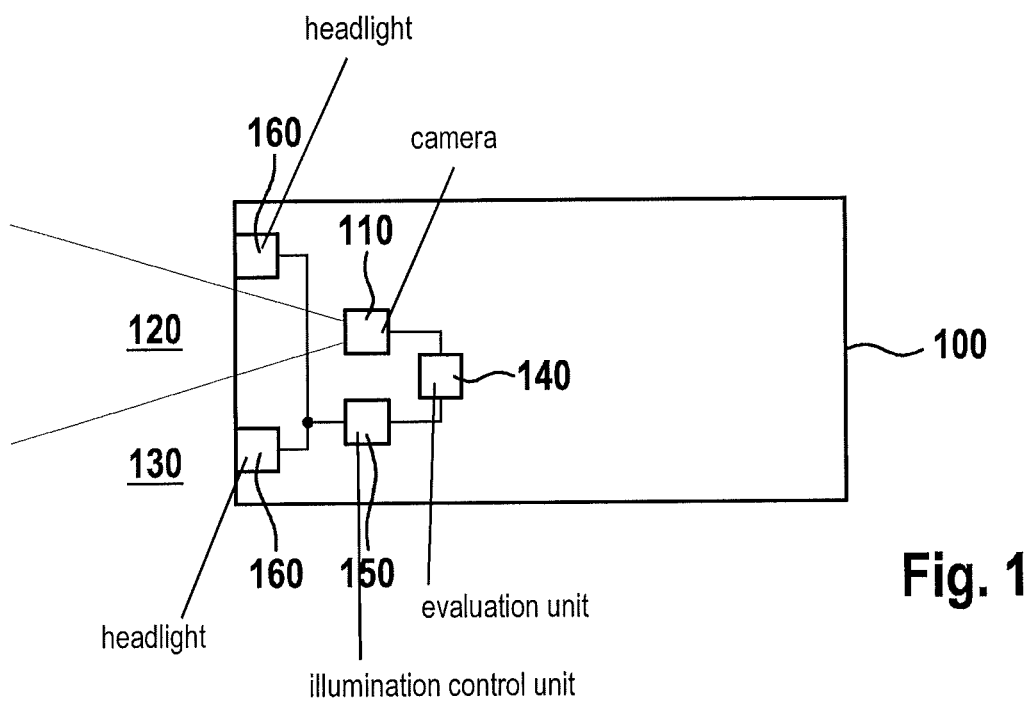
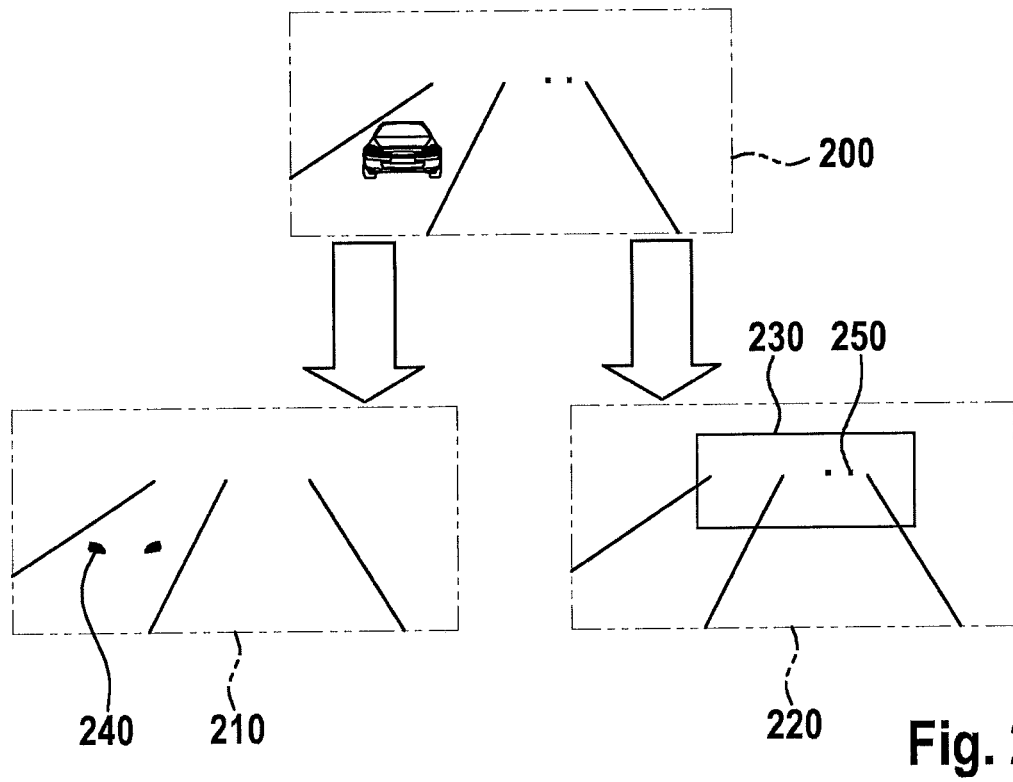

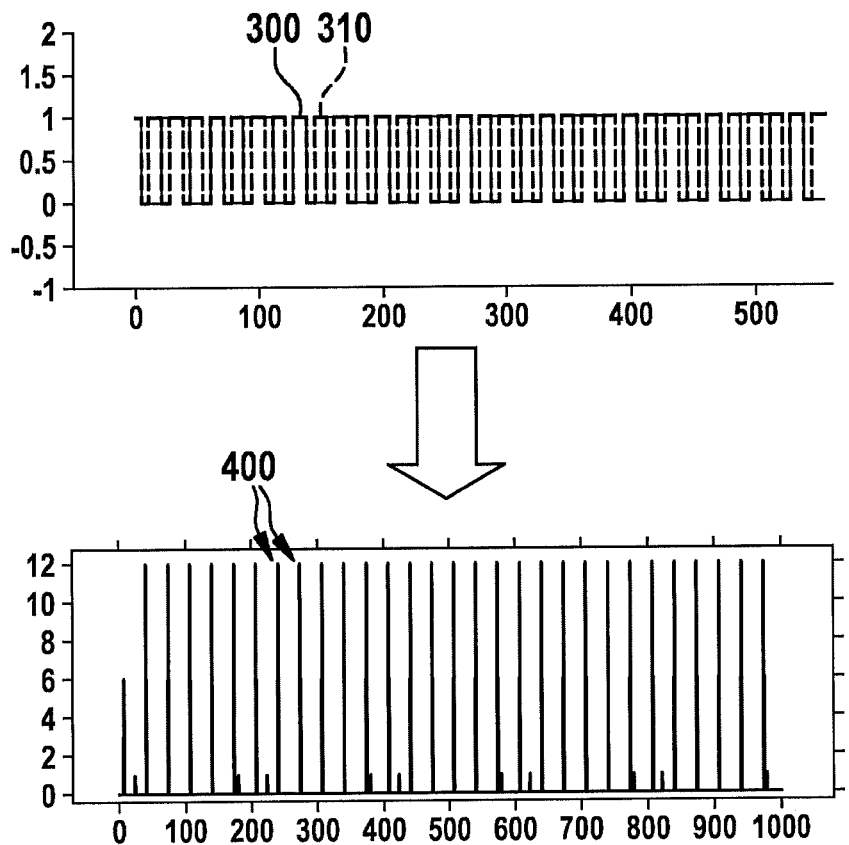
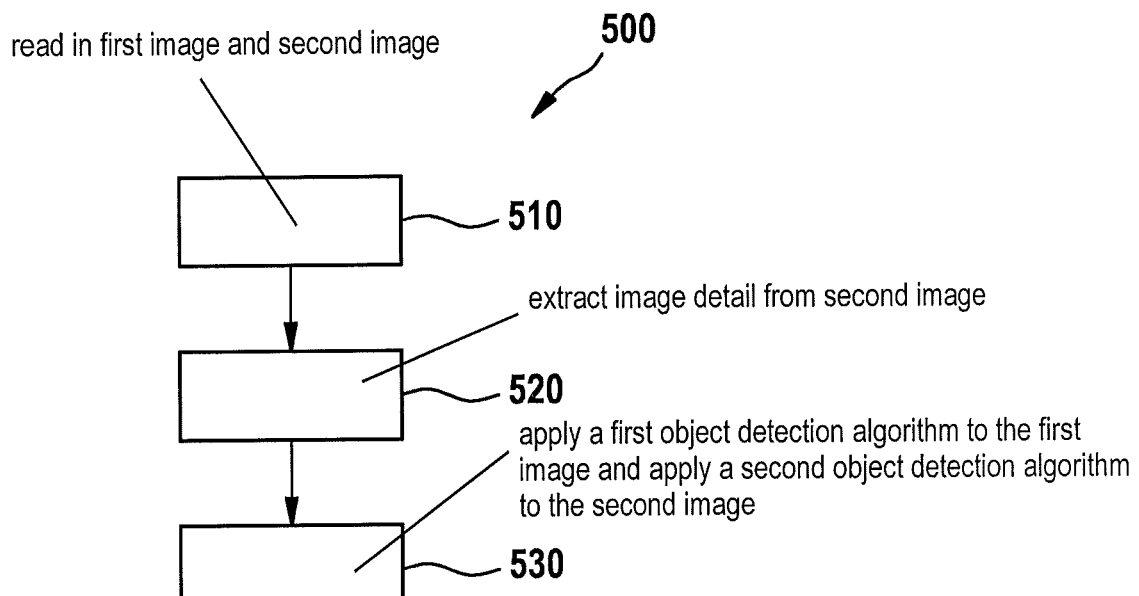
Fig. 4
Fig. 5

METHOD AND DEVICE FOR DETECTING OBJECTS IN THE SURROUNDINGS OF A VEHICLE

FIELD

The present invention relates to a method for detecting objects in the surroundings of a vehicle, to a corresponding device as well as to a corresponding computer program product.

BACKGROUND INFORMATION

In order to achieve as good as possible a detection of objects from an image of a camera of a vehicle, as detailed as possible an evaluation should take place of available information. In this context, especially at night, it should, however, be considered that, in using images of a vehicle camera, glare may occur because of "overexposure" by headlights from nearby oncoming vehicles, which covers information sent out by preceding vehicles which, for example, may be located farther away. To avoid such glare, systems may be used, for example, which measure one scene in the vehicle's surroundings using one or more exposure times, and carry out the same function for each image or carry out in each case only one evaluation function.

German Patent Application No. DE 10 2007 001 099 A1 relates to an evaluation device for a driver assistance system for a vehicle, having an input for the reception of image data taken by a camera, a first component for finding an image detail containing a specified shape in first image data received by the camera, a second component for requesting second image data, the second image data corresponding to a renewed taking of an image detail found by the first component having improved contrast compared to the first image data.

Furthermore, there is a third component present to identify a traffic sign in the second image data as well as an output for emitting a signal concerning a traffic sign identified by the third component.

SUMMARY

In accordance with the present invention, an example method is provided for detecting objects in a vehicle's surroundings, an example device is provided which uses this method, and a corresponding computer program product is provided. Advantageous refinements are derived from the description below.

The present invention provides an example method for detecting objects in a vehicle's surroundings, the method including:
reading in a first image of a vehicle camera, which represents the surroundings of the vehicle and which was taken using a first exposure time and reading in a second image of the vehicle camera, which was taken at a different time than the first image and using a second exposure time that differs from the first exposure time;
extracting an image detail from the second image of the vehicle camera, the image detail preferably representing a smaller area of the surroundings of the vehicle's surroundings than the first image; during the extraction, a position of the image detail in the second image being determined based on at least one parameter which represents information on the travel of the vehicle and/or a position of an infrastructure element in front of the vehicle and/or which is independent of a moving object that was detected in a preceding step in the image detail.
applying a first object detection algorithm to the first image, in order to detect at least one object in the first image, and applying a second object detection algorithm to the image detail of the second image, in order to detect at least one additional object in the image detail.

The present invention further provides an example device that is developed to carry out or implement the example method according to the present invention in corresponding pieces of equipment. This embodiment variant of the present invention in the form of a device may also be used quickly and efficiently to achieve the object on which the present invention is based.

The present invention also provides an example device for detecting objects in the surroundings of a vehicle, the device including:
an interface for reading in a first image, of a vehicle camera, which represents the surroundings of the vehicle and which was taken using a first exposure time and reading in a second image of the vehicle camera, which was taken after the first image and using a second exposure time that differs from the first exposure time;
a unit for extracting an image detail from the second image of the vehicle camera, the image detail preferably representing a smaller area of the surroundings of the vehicle than the first image; during the extraction, a position of the image detail in the second image being determined based on at least one parameter which represents information on the travel of the vehicle and/or a position of an infrastructure element in front of the vehicle and/or which is independent of a moving object that was detected in a preceding step in the image detail;
a unit for applying a first object detection algorithm to the first image, in order to detect at least one object in the first image and applying a second object detection algorithm to the image detail of the second image, in order to detect at least one further object in the image detail.

In the case at hand, by a device one may understand an electrical device which processes sensor signals and outputs control signals or information signals as a function thereof. The device may have an interface developed as hardware and/or software. In a hardware implementation, the interfaces may be part of a so-called system ASIC, for instance, which contains various functionalities of the device. However, it is also possible for the interfaces to represent discrete, integrated switching circuits on their own or to be at least partially made up of discrete components. In a software design, the interfaces may be software modules which are present on a microcontroller in addition to other software modules, for example.

A computer program product is also of advantage, having program code that may be stored on a machine-readable carrier such as a semiconductor memory, a hard-disk memory or an optical memory, which is used to implement the example method according to one of the specific embodiments described above, when the program is run on a computer or a device.

By a vehicle camera one may understand an optical sensor which transforms a scene or the surroundings of a vehicle into a video image, and provides this to other components for further processing. In this context, this optical sensor may operate in a plurality of modes, each mode being distinguished by a different exposure time for taking an image in this mode. By image detail one may understand a subsection of an image of the vehicle camera, in which a smaller part of the surroundings of the vehicle is imaged than in an image of the vehicle camera. A position of this image detail may be established before the step of extracting, for instance, by a parameter which is independent of a moving object (such as a vehicle), which was detected in a preceding step in the image detail or which is a function of a parameter which represents information on the travel of the vehicle. The position of the image detail may also be a function by a position of an infrastructure element in front of the vehicle, the infrastructure element being understood, for example, to be a road construction measure such as a road lantern or a delineator. Alternatively or in addition, such a parameter may also be independent of a moving vehicle which was detected in the image detail in a preceding step. A parameter which represents information on the travel of the vehicle may be, for instance, information of a sensor, which represents a motion of the host vehicle or the setting of operating elements for steering the vehicle. The information on the travel of the vehicle may be such as the speed of the vehicle, a steering angle by the steering wheel or an assumed course of the road that is predicted or read out from a navigation device. By the object that is detected in the first image or a second object that is detected in the image detail, one may understand a vehicle, for example, that is detected in the respective image or image detail. Alternatively or in addition, the object detected in the first image may also be a constructional measure or unit, particularly an infrastructure element at the edge of the roadway (e.g., a delineator or a road lantern). Also alternatively or in addition, the second object detected in the image detail may also be a constructional measure or unit, particularly an infrastructure element at the edge of the roadway, e.g., also a delineator or a road lantern. In particular, the second exposure time is able to be greater than the first exposure time, so that objects are able to be detected in the image detail that have a lower brightness than the objects detected in the first image. It is thereby possible to detect objects in the image detail that are at a greater distance from the vehicle having the vehicle camera and/or which emit less light or differently colored light than the objects detected in the first image. The first object detection algorithm may be identical to the second object detection algorithm, in this instance, but constructed in the same way. Alternatively, the first object detection algorithm may have different steps from the second object detection algorithm. Also, the first object detection algorithm may be constructed to have the same steps as the second object detection algorithm, but to use different parameters. In this context, the object detection algorithm may be applied to the first image while using a first parameter set, and the object detection algorithm may be applied to the image detail while using a second parameter set.

The present invention is based on the realization that images from a single camera in a vehicle are able to be evaluated, on the one hand, by corresponding object detection algorithms and, on the other hand, different image regions are able to be selected from images taken using different exposure times. In this connection, tracking of an image detail may be conditioned upon parameters which are not based on moving objects or vehicles which were themselves detected in the corresponding image detail at a preceding point in time. In this way, in particular, a region in front of the vehicle is able to be continually monitored for weakly luminous objects, this region being of special importance for the future position of the vehicle during its travel. In particular, it may be detected whether, in the vehicle's surroundings, which are represented by the image detail, there is present an object or a vehicle which should be taken into consideration during the setting of the light radiation in front of the vehicle to avoid the dazzling of a driver in this object or vehicle.

The present invention has the advantage that now, by the separation of the evaluation of images, that were taken using different exposure times, by each having its own object detection algorithm is able to be avoided that, in the case of a long exposure time of an image, objects or vehicles in front of the vehicle are not detected, which are swamped out by light emission from other objects or vehicles in front of the vehicle. At the same time, the application of highly complex object detection algorithms may be avoided which detect from one image both objects or vehicles that radiate a high light intensity and objects or vehicles which radiate a low light intensity. In this way, one may achieve simplification of the evaluation of images of a single vehicle camera, which operates in a plurality (at least two) of modes (particularly exposure modes) and provides correspondingly exposed images. At the same time, however, the camera installed in the vehicle, and with that, a single hardware, that is already being provided in mass production, may be used to provide input signals for implementing the present invention. Furthermore, by a technically simply implementable modification of evaluation software and an appropriate reprogramming of evaluation units already provided in vehicles, implementation of additional utilization may be made possible.

It is favorable if, in the step of extracting, the image detail is extracted while using position information, the position information, responding to information which represents the travel of the vehicle, being modifiable or being modified. By position information one may understand information on a localization of the image detail in the second image and/or the size of the image detail in the second image. Such a specific embodiment of the present invention yields the advantage that, during travel of the vehicle, image details are able to be processed that are situated at different positions in the second image or which include different sized image regions of the second image. In this way, a tracking, or a projecting of the presence of the image detail, especially when cornering, becomes possible, objects or vehicles being present or being supposed to be there in the image detail which are there relevant to cornering of the vehicle for the vehicle's safety or the illumination of the region in front of the vehicle. In expressway travel of the vehicle (or, more generally, during rapid travel of the vehicle) for instance, the image detail may be enlarged, in order to ensure sufficient consideration of rapidly moving objects or vehicles, particularly in the case of long exposure times.

According to another specific embodiment of the present invention, in the reading in step, an image may be read in as the first image which has a shorter exposure time than the image that is read in as the second image. In the step of applying, the first object detection algorithm may advantageously be used on the entire first image. In particular, in such an exemplary embodiment, the entire image is processed having the shorter exposure time by the first object detection algorithm. Such a specific embodiment of the present invention has the advantage that objects within the close range of the vehicle, which are distinguished particularly by a high emitted light intensity, are detected as quickly and unequivocally as possible. In particular, such objects or vehicles, in the close range of the vehicle, require increased precautions so as, for example, not to dazzle the driver of such vehicles in the close range of the host vehicle. If, on the other hand, a driver of such a vehicle in the close range of the vehicle were dazzled, the safety of the host vehicle would be considerably endangered.

Moreover, it is favorable if, in the step of extracting, an image detail of the second image is extracted, in which objects are imaged in the image of the vehicle camera, which are situated at a predetermined minimum distance ahead of the vehicle. Such a specific embodiment of the present invention has the advantage that objects or vehicles in the surroundings of the vehicle may also be detected which are situated farther away from the vehicle. In particular, if in this image detail no objects or vehicles are to be expected, from which a high light emission or reflection is to be expected, it may be ensured by such a specific embodiment of the present invention that no information loss takes place of information via more weakly illuminated or luminous objects or vehicles by a "dissolving" by light emission from objects or vehicles in the close range of the host vehicle.

According to one further specific embodiment of the present invention, in the applying of the first object detection algorithm step, a first object type may be used for the detection of objects, and the second object detection used for detecting objects of a second object type, which differs from the first object type. The first object type may represent a headlight, for example, while the second object type represents rear lights, delineators or road lanterns. Such a specific embodiment of the present invention has the advantage that different object types may be detected from the images of the vehicle camera, depending on which light emission properties are to be expected from the respective object type.

It is especially advantageous if, in the applying step, the first object detection algorithm is developed to detect an object in the first image while using a comparison of the brightness at a position in the first image having a brightness at a corresponding position in the second image, particularly in the image detail. Also, in the applying step, the second object detection algorithm may be developed to detect an object in the second image, especially in the image detail, while using a comparison of the brightness in a position in the second image, especially an image detail, having a brightness at a corresponding position in the first image. Such a specific embodiment of the present invention has the advantage of a distinction or detection, that are technically particularly simple to implement, of objects, the common information of images being able to be used which were taken using different exposure times.

According to one particular specific embodiment of the present invention, in the applying step, an object is able to be detected as a pulsating light source by the first object detection algorithm, if the brightness in the position in the first image is within a tolerance range equal to the brightness at the corresponding position in the second image, particularly in the image detail. Furthermore, an object may also be detected by the first object detection algorithm as a constant light-emitting light source, if the brightness at the position in the first image differs by more than a predetermined threshold value (as a function of the difference in the exposure times) of the brightness at the corresponding position in the second image, particularly in the image detail. Moreover, it is favorable if, because of the second object detection algorithm, an object is detected as a pulsating light source if the brightness at the position in the second image, particularly in the image detail, is within a tolerance range equal to the brightness at the corresponding position in the first image. A specific embodiment of the present invention is also possible in which, because of the second object detection algorithm, an object is detected as a constant light-emitting light source if the brightness at the position in the second image, particularly in the image detail, differs by more than a predetermined threshold value from the brightness at a corresponding position in the first image. By a tolerance range about a brightness value one may understand in this case, for example, a brightness deviation of 10 percent. Such a specific embodiment of the present invention has the advantage that different types of objects are able to be detected quite simply by a comparison of brightnesses at mutually corresponding positions in the second image, particularly in the image detail, and the first image. In this context, it may particularly be utilized that different objects, such as road lanterns, have a different frequency of light emission from vehicle lights or LED vehicle lights, for example. Because of such a specific embodiment of the present invention, one may consequently conclude, technically very simply, that there is a type of object present which is detected or expected at the respective position in the first image or the image detail.

It is further advantageous if, according to one specific embodiment of the present invention, a method is provided for regulating a roadway illumination in front of a vehicle which includes:

the method steps as described above; and actuating a modification of the light radiation of a headlight of the vehicle, responding to at least one object detected by the first object detection algorithm and/or responding to at least one object detected by the second object detection algorithm.

Such a specific embodiment of the present invention has the advantage that by the detection of an object according to a specific embodiment described above, the regulation or actuation of the light radiation of a headlight of the vehicle is simplified in a technically very simple manner. In particular, dazzling a driver of a preceding or oncoming vehicle may be simply avoided or at least decreased thereby, since by detecting the object, especially the type of the object, the light emission by headlights of one's own vehicle may be adjusted accordingly.

According to one specific embodiment of the present invention, it is also possible to detect in the image detail a constructive measure such as an infrastructure element at the edge of the roadway, such as a road lantern or a delineator. In such a specific embodiment of the present invention, in the step of actuating, the modification of the light radiation is able to take place independently of an object detected by the second object detection algorithm.

Below, the present invention is explained in greater detail with reference to the figures by way of example.

BRIEF DESCRIPTION OF THE DRAWINGS

FIG. 1 shows a block diagram of a vehicle in which an exemplary embodiment of the present invention is implemented.

FIG. 2 shows a representation of a scene around the vehicle and the images gathered from this by the vehicle camera, as well as the selection of an image detail in an image according to an exemplary embodiment of the present invention.

FIG. 4 shows a diagram to illustrate a determination of a pulsing light-emitting light source as object.

FIG. 5 shows a flow chart of an exemplary embodiment of the present invention.

DETAILED DESCRIPTION OF EXAMPLE EMBODIMENTS

Figure 3:
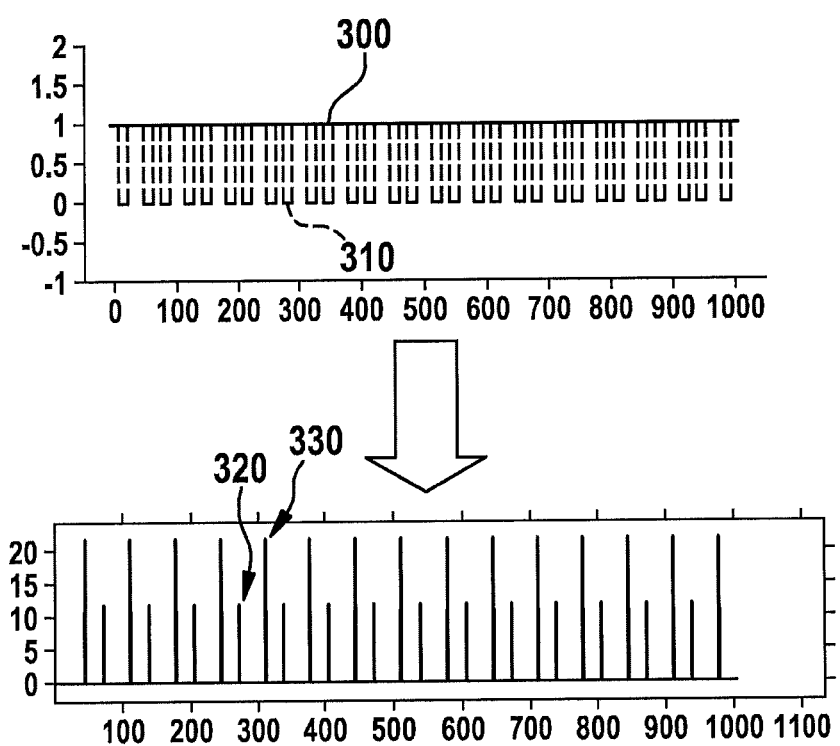
FIG. 3 shows a diagram to illustrate a determination of a constant light-emitting light source as object.

In the description below of preferred exemplary embodiments of the present invention, the same or similar reference numerals are used for the elements that are shown in the various figures and act similarly, so that a repeated description of these elements has been dispensed with.

In vehicle detection at dark, different requirements on an image evaluation system are made, which, in the case of a single exposure time of the image of a camera are able to be satisfied only by using compromises. In particular, distant, and thus comparatively dark rear lights of preceding vehicles are to be detected exactly the same as oncoming traffic, all at different distances. This makes it a condition that, on the one hand, the evaluation system should be very sensitive to dark objects and also robust to halation from close oncoming traffic. These two borderline cases may particularly advantageously be satisfied using a multimodal, but at least bimodal camera regulation: in an image that has been taken using a longer exposure time and in response to which an additional limitation of the image evaluation to a special subarea of the image is selected, rear lights, for example, of far distantly traveling vehicles may be detected and classified. By contrast, based on an image that has been taken using a short exposure time, in the case of oncoming traffic, the headlight pair of a close vehicle may be resolved without the image being so bright, by halation of these bright headlights, that darker objects and/or the object-specific structure itself are no longer able to be detected. This case might be interpreted as a "blinding" of the camera by dazzling because of very bright headlights of a close oncoming vehicle.

Current systems operate either
a) using a single exposure time or
b) in the case of images having several exposure times, using the same routines in each case for the object detection and the object classification.

While in variant a) compromises are required with regard to range and resolution capability at close range, variant b) conditions a complex evaluation strategy in order to ensure the optimal detection and classification of objects relevant to regulation.

Generally, however, the requirements on object detection for controlling light or light emission by the host vehicle, especially during the night and dawn or dusk, are very complex, and are only able to be achieved by compromises when using these design approaches. Because of a multimodal, but at least bimodal exposure control having at least one short-exposed and one long-exposed image taking and its evaluation, the respective borderline cases are clearly able to be covered better. For the evaluation of the images having the respective exposure times, explicitly different processing steps are provided in this context.

FIG. 1 shows a block diagram of a vehicle 100, in which an exemplary embodiment of the present invention is able to be implemented. Vehicle 100 includes a camera 110, which generates an image of a visual range 120 of surroundings 130 in front of vehicle 100. Camera 110 is developed, in this context, so as to take images in a plurality of modes, different modes having different exposure times in taking images in the respective modes. Images generated by camera 110 are transmitted to an evaluation unit 140, in which, according to the following description, an evaluation takes place of the images, and of an image detail of an image, for objects while using object detection algorithms. Now, if certain objects of certain object classes are detected in the visual range 120 of camera 110, such as, for instance, headlights of preceding or oncoming vehicles, a corresponding information is sent to an illumination control unit 150, to ensure that light emission of the headlights 160 of the vehicle 100 controlled by illumination control unit 150 does not radiate any light into surroundings 130 of vehicle 100, which would dazzle preceding or oncoming vehicles.

The exposure times for the different images to be taken by the camera should preferably be selected so that, on the one hand, distant rear lights at a distance of 400 m, and, on the other hand, headlights at a distance of at least 800 m are able to be detected as well as that close oncoming traffic does not lead to an halation of the image, i.e., saturation of all pixels characterizing the object, which makes difficult the resolution and detection of both headlights in the near range. Furthermore, the exposure control should be designed so that the detection of rear lights in the medium distance range (e.g., 100 m to 300 m) is covered by a plurality of exposure times, and thus a robust and rapid classification in this range, which is critical under the aspect of possible dazzling, is ensured.

For the efficient processing of the respective images, for instance, for a longer exposed image, the processing range and the region of interest may be limited as a function of various additional data.

In the upper partial image, FIG. 2 shows a scene 200, which was taken by camera 110 of FIG. 1 in visual range 120 of vehicle 100. This scene 200 is recorded, for example, in a first mode using a first shorter exposure time, from which first image 210, shown at bottom left, is generated and transmitted to evaluation unit 140. In a following step, scene 200 is taken in a second mode using a longer exposure time, and a second image 220 is generated, which is shown in FIG. 2, bottom right. Furthermore, in the second image, an image detail 230 is extracted, which is transmitted for processing to evaluation unit 140. It is also possible that second image 220 itself is transmitted to evaluation unit 140 of FIG. 1, and image detail 230 is extracted only in evaluation unit 140.

In evaluation unit 140 the (entire) first image is able to be detected for bright (close) objects 240, such as a pair of headlights of an oncoming vehicle by the applying of a first object detection algorithm to the first image, which is located in great spatial closeness to host vehicle 100, i.e., vehicle 100 having camera 110. Because of the analysis of the entire first image it may be ensured that no objects in great proximity to the vehicle are missed, which, when not taken into consideration of the control of light emission could lead to dazzling a person who leads this object or vehicle, so that an endangerment of the travel safety of the host vehicle is to be feared.

Moreover, in evaluation unit 140 a second object detection algorithm is also applied to image detail 230 of second image 220, so that objects 250 in this image detail 230 are also detected. In this instance, for example, the applying of the second object detection algorithm which is applied to the image detail, may be omitted in areas of the second image outside the image detail. These objects 250 that are to be recognized in image detail 230 may be distant (i.e., darker appearing) objects 250 which represent rear lights of vehicles traveling in front of vehicle 100, for example. Because of the evaluation of image detail 230, which should favorably be selected so that no close, bright objects 240 as the headlights shown in the left lower representation of FIG. 2 are to be taken into consideration by oncoming vehicles in the object detection of the image detail, the dissolving of the image to be evaluated by these bright objects is able to be avoided. The image detail, which represents a limited area of the second image having the longer exposure time, thus makes possible the detection of distant objects, which, compared to closer objects, usually appear darker, and consequently are better detectable by being taken using the longer exposure time, as in an image that has been taken using one single exposure time for evaluation of close and also distant objects.

Now, if the vehicle is traveling on a curvy road, it is advantageous if the image detail is also not taken statically from a predetermined area from the second image. Particularly during cornering in a curve towards the left, it is favorable, for example, if also that area, which is taken from the second image as image detail, is displaced farther towards the left edge of the second image. In this way it may be ensured that, for example, preceding vehicles or other objects in the left curve of the roadway lying ahead, are still able to be detected sufficiently, since they are then lying in the image detail that is to be evaluated. In order to make possible such a change in the position of the image detail in the second image, very different types of data may be used. Among these data are the speed of the vehicle, for example, the steering angle of the vehicle steered, a course of the road that is predicted or is assumed from an evaluation of a course of road lanterns or delineators (for instance, by the high light reflections that are able to be detected in the first image). Furthermore, navigation data, i.e., data from navigation systems, modeled assumptions on the detection probability of various object types in certain areas of the image, and so on, may be used as data for the shifting or the modification of the position of the image detail in the second image.

The different exposure times may further support the detection of pulsed light sources (such as road lanterns and LED rear or front lights (50 Hz 160 Hz)). One exemplary embodiment for the detection of such pulsed light sources is shown in FIGS. 3 and 4.

FIG. 3 shows two diagrams for detecting a measured brightness of a constantly luminous light source having a bimodally regulated camera. In the upper representation of FIG. 3, on the abscissa, time is shown (in the form of continuous image numbers) and on the ordinate, the measured (normalized to one value) light intensity 300 of a light source (having constant light emission) compared to a measurement 310 of the light intensity of this light source by the camera. By the scanning of a constantly luminous light source having a bimodally regulated camera, i.e., by taking different images one after another, there results a representation in which the light source appears in the image as a pulsating object. The property of pulsating may be better detected by a comparison of the brightness of an object in various exposure times. In this context, for example, the brightness or light intensity of the object in the first image is compared to the brightness or light intensity in the image detail. In this case, an object in the first image should lie in a position which corresponds to a position which also lies in the image detail of the second image, so that an evaluation of the brightnesses of the object using different exposure times becomes possible. The brightness or the light intensity of an object that does not lie in the image detail may also be evaluated, in this case, then, the second image should be drawn upon for the evaluation, instead of the image detail.

In the case of a constantly light-emitting light source, there results a brightness curve as is reproduced in FIG. 3, in the lower representation. The constantly luminous light source in the images having different exposure times have different brightness intensities, in this instance. For example, the light source in the image having the shorter exposure time has a lower brightness value 320 than in the image having the longer exposure time, in which a larger brightness value 330 occurs for the constantly luminous light source. Consequently, the measured light intensity or the brightness of a constantly luminous light source varies with a bimodally regulated camera corresponding to the different exposure times for the evaluated images. A constantly luminous light source thus presents a different picture for the respective illumination times. Consequently, the change in the brightness or the light intensity during an evaluation of images, which were taken at a different illumination time, may be used as important information for the classification of self-luminous objects. In this way, for example, distant road lanterns having a light emission frequency of 50 to 60 Hz are able to be detected corresponding to the frequency of the power supply network, at which the headlights of the host vehicle are not to be dimmed. Reflecting objects may also be detected, for example, because of which, by a modulation of the frequency of light emission by the headlights of the host vehicle, the modulated light correspondingly reflected at the object is able to be detected.

It is generally true that a pulsating light source is perceived by a unimodally regulated camera as pulsating only if the scanning frequency (e.g. 30 images/sec=30 Hz) is not a multiple of the pulse frequency of the light source. When using a 30 Hz camera, one regards a 60 Hz light source as being constantly luminous (at the typical integration times per image for darkness). In the case of a bimodally regulated camera, one is able to circumvent this limitation, as will be shown in greater detail by the procedure below.

It is shown in FIG. 4 how a pulsed light source is able to be recognized. In this instance, in the upper representation of FIG. 4, the brightness values of a scanning of a light source pulsed at 60 Hz are reproduced, using a bimodally regulated camera. In the upper representation of FIG. 3, on the abscissa, time is shown (in the form of continuous image numbers) and on the ordinate, the measured (normalized to one value) light intensity 300 of a light source (having constant light emission) compared to a measurement 310 of the light intensity of this light source by the camera. As may be seen in the upper representation in FIG. 4, the points in time and the time intervals of the light emission by the pulsed light source overlap with the points in time and the time intervals of the scanning or exposure of the corresponding images to be evaluated by the camera. From the lower diagram of FIG. 4, one may see that such scanning of overlapping exposure time intervals, using light emission time intervals of the pulsed light source in brightness values 400 for the light source results in both images which are equal within a tolerance range. Consequently, a pulsed light source is imaged for the different exposure times in different images having very similar brightness values. The measuring results of the light intensity of the light source, which are gained from the images having the different exposure times, thus do not change corresponding to the exposure times of the respective evaluated images, whereby the pulsating of such a light source is able to be detected.

Furthermore, a longer exposure time has the effect of a more stable expression of the properties of pulsed light sources in the image, and by this a more valid color reconstruction and shape analysis of the light object becomes possible. By contrast, the data from the briefly exposed image show up in richer contrast, since the blurred contour turns out to be less, which is particularly advantageous in the estimation of the motion and its direction.

FIG. 5 shows a flow chart of an exemplary embodiment of the present invention as method 500, for detecting objects in the surroundings of a vehicle. Method 500 includes a step of reading in 510 a first image, of a vehicle camera, which represents the surroundings of the vehicle and which was taken using a first exposure time, in the step of reading in, reading in a second image of the vehicle camera taking place, which was taken after the first image and using a second exposure time; the second exposure time differing from the first exposure time. Moreover, method 500 includes a step for extracting 520 an image detail from the second image of the vehicle camera, the image detail representing a smaller area of the surroundings of the vehicle than the second image; during the extraction, a position of the image detail in the second image being determined based on at least one parameter which represents information on the travel of the vehicle and/or a position of an infrastructure element in front of the vehicle and/or which is independent of a moving object that was detected in a preceding step in the image detail. Finally, method 500 includes a step of applying 530 a first object detection algorithm to the first image, in order to detect at least one object in the first image and applying a second object detection algorithm to the image detail, in order to detect at least one further object in the image detail.

The exemplary embodiments described and shown in the figures have been selected merely as examples. Different exemplary embodiments are combinable with one another, either completely or with regard to individual features. An exemplary embodiment may also be supplemented by features from another exemplary embodiment.

Furthermore, method steps according to the present invention may be carried out repeatedly and also performed in a sequence other than the one described.

If an exemplary embodiment includes an "and/or" linkage between a first feature and a second feature, this may be understood to mean that the exemplary embodiment according to one specific embodiment has both the first feature and the second feature, and according to an additional specific embodiment, either has only the first feature or only the second feature.

What is claimed is:

1. A method for detecting objects in surroundings of a vehicle, comprising:
   repeating at a predetermined interval: reading in a first image of a vehicle camera, which represents the surroundings of the vehicle and which was taken using a first exposure time, and reading in a second image of the vehicle camera, which was taken after the first image and using a second exposure time, the second exposure time differing from the first exposure time;
   extracting an image detail from each of the second images of the vehicle camera, the image detail representing a smaller area of the surroundings of the vehicle than the first images, during the extracting, a displaced or changed position of the image detail in the second image being determined based on using a speed of travel of the vehicle, wherein the extracting of the image detail is based on the determined position;
   applying a first object detection algorithm to the first images to detect at least one object in the first images, the at least one object including a headlight of an oncoming vehicle, and applying a second object detection algorithm to the image details to detect at least one further object in the image details, the at least one further object including a rear light of a preceding vehicle; and
   controlling a headlight of the vehicle based on at least one of: the at least one object detected by the first object detection algorithm, or the at least one further object detected by the second object detection algorithm.

2. The method as recited in claim 1, wherein, in the extracting step, the image detail is extracted using position information, wherein the position information is changed in response to information which represents travel of the vehicle.

3. The method as recited in claim 1, wherein the first exposure time is shorter than the second exposure time.

4. The method as recited in claim 1, wherein, in the applying step, the first object detection algorithm is used on the entire first image.

5. The method as recited in claim 1, wherein, in the extracting step, an image detail of the second image is extracted, in which objects are imaged in the image of the vehicle camera, which are situated at a predetermined minimum distance ahead of the vehicle.

6. The method as recited in claim 1, wherein, in the applying step, the first object detection algorithm is used for the detection of objects of a first object type, and the second object detection algorithm is used for detecting objects of a second object type, which differs from the first object type.

7. The method as recited in claim 1, wherein, in the applying step, the first object detection algorithm detects an object in the first image while using a comparison of a brightness at a position in the first image to a brightness at a corresponding position in the image detail.

8. The method as recited in claim 1, wherein in the applying step, the second object detection algorithm detects an object in the image detail while using a comparison of a brightness at a position in the image detail, to a brightness at a corresponding position in the first image.

9. The method as recited in claim 8, wherein the applying step includes:
   determining, by the second object detection algorithm that the brightness at the position in the image detail differs by more than a predetermined threshold value from the brightness at the corresponding position in the first image; and
   detecting, by the second object detection algorithm, that the object is a light source that is constantly emitting light, based on the determination.

10. The method of claim 1, wherein the repeating at the predetermined interval the reading in of the first image and the reading in of the second image includes periodically reading in the first image and periodically reading in the second image, the periodic reading in of the second image being offset in time from the periodic reading in of the first image by less than a period of the periodic reading in of the first image.

11. The method as recited in claim 1, further comprising omitting applying the second object detection algorithm to areas of the second images outside the image details.

12. A method for detecting objects in surroundings of a vehicle, comprising:
   reading in a first image of a vehicle camera, which represents the surroundings of the vehicle and which was taken using a first exposure time, and reading in a second image of the vehicle camera, which was taken after the first image and using a second exposure time, the second exposure time differing from the first exposure time;
   extracting an image detail from the second image of the vehicle camera, the image detail representing a smaller area of the surroundings of the vehicle than the first image, during the extracting, a position of the image detail in the second image being determined at least one of: i) based on information regarding travel of the vehicle, ii) based on a position of an infrastructure element in front of the vehicle, or iii) independent of a moving object that was detected in a preceding step in the image detail, wherein the extracting of the image detail is based on the determined position;

applying a first object detection algorithm to the first image to detect at least one object in the first image, and applying a second object detection algorithm to the image detail to detect at least one further object in the image detail, the first object detection algorithm detecting the at least one object in the first image while using a comparison of a brightness at a position in the first image to a brightness at a corresponding position in the image detail;

determining, by the first object detection algorithm, that the brightness at the position in the first image is within a tolerance range equal to the brightness at the corresponding position in the image detail;

detecting, by the first object detection algorithm, that the at least one object is a pulsating light source based on the determination; and controlling a headlight of the vehicle based on at least one of: the at least one object detected by the first object detection algorithm, or the at least one further object detected by the second object detection algorithm.

13. A method for detecting objects in surroundings of a vehicle, comprising:

reading in a first image of a vehicle camera, which represents the surroundings of the vehicle and which was taken using a first exposure time, and reading in a second image of the vehicle camera, which was taken after the first image and using a second exposure time, the second exposure time differing from the first exposure time;

extracting an image detail from the second image of the vehicle camera, the image detail representing a smaller area of the surroundings of the vehicle than the first image, during the extracting, a displaced or changed position of the image detail in the second image being determined based on using a speed of travel of the vehicle, wherein the extracting of the image detail is based on the determined position;

applying a first object detection algorithm to the first image to detect at least one object in the first image, and applying a second object detection algorithm to the image detail to detect at least one further object in the image detail, the first object detection algorithm detecting the at least one object in the first image while using a comparison of a brightness at a position in the first image to a brightness at a corresponding position in the image detail;

determining, by the first object detection algorithm, that the brightness at the position in the first image differs by more than a predetermined threshold value from the brightness at the corresponding position in the image detail;

detecting, by the first object detection algorithm, that the at least one object is a light source that is constantly emitting light, based on the determination; and controlling a headlight of the vehicle based on at least one of: the at least one object detected by the first object detection algorithm, or the at least one further object detected by the second object detection algorithm.

14. A method for detecting objects in surroundings of a vehicle, comprising:

repeating at a predetermined interval: reading in a first image of a vehicle camera, which represents the surroundings of the vehicle and which was taken using a first exposure time, and reading in a second image of the vehicle camera, which was taken after the first image and using a second exposure time, the second exposure time differing from the first exposure time;

extracting an image detail from each of the second images of the vehicle camera, the image detail representing a smaller area of the surroundings of the vehicle than the first images, during the extracting, a position of the image detail in the second image being determined based on information regarding travel of the vehicle, the information regarding the travel of the vehicle including at least one of: i) a speed of the vehicle, or ii) a course of a road determined using a navigation device, wherein the extracting of the image detail is based on the determined position;

applying a first object detection algorithm to the first images to detect at least one object in the first images, the at least one object including a headlight of an oncoming vehicle, and applying a second object detection algorithm to the image details to detect at least one further object in the image details, the at least one further object including a rear light of a preceding vehicle; and controlling a headlight of the vehicle based on at least one of: the at least one object detected by the first object detection algorithm, or the at least one further object detected by the second object detection algorithm;

wherein in the applying step, the second object detection algorithm detects an object in the image detail while using a comparison of a brightness at a position in the image detail, to a brightness at a corresponding position in the first image;

wherein the applying step includes:
determining, by the second object detection algorithm, that the brightness at the position in the image detail is within a tolerance range equal to the brightness at the corresponding position in the first image; and
detecting, by the second object detection algorithm, that the object is a pulsating light source, based on the determination.

15. A method for regulating a roadway illumination in front of a vehicle, comprising:

repeating at a predetermined interval: reading in a first image of a vehicle camera, which represents the surroundings of the vehicle and which was taken using a first exposure time, and reading in a second image of the vehicle camera, which was taken after the first image and using a second exposure time, the second exposure time differing from the first exposure time;

extracting an image detail from each of the second images of the vehicle camera, the image detail representing a smaller area of the surroundings of the vehicle than the first images, during the extracting, a displaced or changed position of the image detail in the second image being determined based on using a speed of travel of the vehicle, wherein the extracting of the image detail is based on the determined position;

applying a first object detection algorithm to the first images to detect at least one object in the first images, the at least one object including a headlight of an oncoming vehicle, and applying a second object detection algorithm to the image details to detect at least one further object in the image details, the at least one further object including a rear light of a preceding vehicle; and actuating a modification of light radiation of a headlight of the vehicle, at least one of: in response to at least one object detected by the first object detection algorithm, or in response to at least one object detected by the second object detection algorithm.

16. The method as recited in claim 15, wherein, in the actuating step, the modifying of the light radiation takes place independently of an infrastructure device at the roadway edge detected by one of the first or the second object detection algorithms.

17. The method as recited in claim 15, wherein during the extracting, a position of the image detail in the second image being determined at least one of: i) based on information regarding travel of the vehicle, ii) based on a position of an infrastructure element in front of the vehicle, or iii) independent of a moving object that was detected in a preceding step in the image detail.

18. A device to detect objects in surroundings of a vehicle, the device configured to:
repeat at a predetermined interval: reading in a first image of a vehicle camera, which represents the surroundings of the vehicle and which was taken using a first exposure time, and reading in a second image of the vehicle camera, which was taken after the first image and using a second exposure time, the second exposure time differing from the first exposure time;
extract an image detail from each of the second images of the vehicle camera, the image details representing a smaller area of the surroundings of the vehicle than the first images, during the extracting, a displaced or changed position of the image detail in the second image being determined based on using a speed of travel of the vehicle, wherein the extraction of the image detail is based on the determined position;
apply a first object detection algorithm to the first images to detect at least one object in the first images, the at least one object including a headlight of an oncoming vehicle, and applying a second object detection algorithm to the image details to detect at least one further object in the image details, the at least one further object including a rear light of a preceding vehicle; and
control a headlight of the vehicle based on at least one of: the at least one object detected by the first object detection algorithm, or the at least one further object detected by the second object detection algorithm.

19. A non-transitory machine-readable storage medium storing program code for detecting objects in surrounds of a vehicle, the program code, when executed by a processor, causing the processor to perform the steps of:
repeating at a predetermined interval: reading in a first image of a vehicle camera, which represents the surroundings of the vehicle and which was taken using a first exposure time, and reading in a second image of the vehicle camera, which was taken after the first image and using a second exposure time, the second exposure time differing from the first exposure time;
extracting an image detail from each of the second images of the vehicle camera, the image details representing a smaller area of the surroundings of the vehicle than the first images, during the extracting, a displaced or changed position of the image detail in the second image being determined based on using a speed of travel of the vehicle, wherein the extracting of the image detail is based on the determined position;
applying a first object detection algorithm to the first images to detect at least one object in the first images, the at least one object including a headlight of an oncoming vehicle, and applying a second object detection algorithm to the image details to detect at least one further object in the image details, the at least one further object including a rear light of a preceding vehicle; and
controlling a headlight of the vehicle based on at least one of: the at least one object detected by the first object detection algorithm, or the at least one further object detected by the second object detection algorithm.

* * * * *